United States Patent [19]

Kaminski

[11] Patent Number: 4,536,765

[45] Date of Patent: Aug. 20, 1985

[54] METHOD FOR REDUCING ICE AND SNOW BUILD-UP ON THE REFLECTING SURFACES OF DISH ANTENNAS

[75] Inventor: Elton G. Kaminski, Sidney, Ohio

[73] Assignee: The Stolle Corporation, Sidney, Ohio

[21] Appl. No.: 408,158

[22] Filed: Aug. 16, 1982

[51] Int. Cl.$^3$ .............................................. H01Q 1/02
[52] U.S. Cl. .................................................. 343/704
[58] Field of Search ............... 294/54.5; 343/704, 912, 343/915, 840

[56] References Cited

U.S. PATENT DOCUMENTS

| | | | |
|---|---|---|---|
| 3,249,947 | 5/1966 | Williams | 343/912 |
| 3,483,614 | 12/1969 | Kazimi | 343/840 |
| 4,149,744 | 4/1979 | Bonnes | 294/54.5 |
| 4,195,302 | 3/1980 | Leupelt | 343/704 |
| 4,259,671 | 3/1981 | Levin | 343/704 |
| 4,364,053 | 12/1982 | Hotine | 343/915 |

FOREIGN PATENT DOCUMENTS

| | | | |
|---|---|---|---|
| 1054512 | 4/1959 | Fed. Rep. of Germany | 343/704 |
| 1407886 | 10/1975 | United Kingdom | 343/704 |

Primary Examiner—Eli Lieberman
Assistant Examiner—Karl Ohralik
Attorney, Agent, or Firm—Frost & Jacobs

[57] ABSTRACT

A thin layer of a non-stick coating having a low coefficient of friction and a low solar reflectivity producing a non-wettable surface is applied to the reflecting face of an inclined dish receiving antenna to prevent the build-up of ice or snow on the reflecting face of the antenna.

10 Claims, 3 Drawing Figures

METHOD FOR REDUCING ICE AND SNOW BUILD-UP ON THE REFLECTING SURFACES OF DISH ANTENNAS

SUMMARY OF THE INVENTION

One of the problems with dish-shaped receiving and transmitting antennas is the accumulation of ice or snow on the concave reflecting face of the antenna. Since the antenna is essentially a bowl-shaped object inclined upwardly at a particular angle so that the electrical bore site of the antenna is pointed at a synchronous satellite of interest, such accumulation or build-up is normally not uniform over the entire antenna surface. Rather, the lower portion of the antenna, being flatter and inclined at less of an angle, tends to accumulate a greater thickness of ice or snow. This uneven build-up distorts the normal reflecting surface of the antenna such that in the case of a receiving antenna, the received signals are no longer concentrated at the antenna focal point where the receiving components are located. Rather, the reflecting surface now distorted by snow and ice build-up, reflects the receive signals to a displaced focal point causing a substantial loss in receiving signal strength.

In some cases, ice and snow may accumulate in a more or less uniform layer over the reflecting surface of the antenna causing a loss in antenna gain due to attenuation of the reflected signal as it passes through the ice and snow layer.

This problem is prevented in larger and more expensive antenna installations by providing thermostatically controlled heating elements within the antenna which warm the reflecting surface sufficiently to prevent the accumulation of ice and snow. However, this approach is generally not economically feasible for smaller less expensive dish antennas where the heating means may represent a substantial part of the overall antenna cost.

It is believed that the ice and snow accumulation results from two factors. First, the conventional reflecting face of the antenna is usually provided with a roughened surface, sometimes by finishing the face with a coarsely textured paint. The roughened surface increases the coefficient of friction between the antenna surface and the ice or snow accumulated thereon and prevents the accumulation from sliding off under the influence of gravity even at relatively large antenna inclination angles. In many instances, the roughened reflecting surface is used to reduce the solar reflectivity which could cause solar radiation to be accumulated at the antenna receiver located at the focal point of the antenna, causing high temperatures and possible damage to the receiving components. In addition, it is believed that such surfaces are wettable, i.e. water will tend to "stick" to the surface, rather than beading and flowing off.

The present invention is directed to a method for coating the reflecting surface of such dish antennas to improve their ice and snow shedding capability. In a preferred embodiment, the antenna is provided, either at the time of manufacture or after installation, with a thin layer of weather resistant material having a low coefficient of friction which produces a non-wettable outer surface. The layer may be composed of certain types of non-stick coatings such as Teflon or various types of waxes or fortified waxes. The solar reflectivity of the material is also modified so as to reduce the amount of solar radiation reflected to the receiving components positioned at the focal point of the antenna. The solar energy which is not reflected is absorbed by the coated surface, thereby warming the reflecting surface and further contributing to the ice and snow shedding ability.

In one embodiment, the coating or reflecting surface of the antenna is provided with a textured pattern which may be described as minute smoothly rounded "hills and valleys", "orange peel" or "pebbled". This patterned surface that avoids a coating structure containing interstices that would create sites for ice or snow to mechanically adhere to the coating surface. Nonetheless, this type of structure provides a smooth surface, thereby reducing the coefficient of friction between the surface and the ice or snow.

Further features of the invention will become apparent from the detailed description which follows.

DETAILED DESCRIPTION

Figure 1:
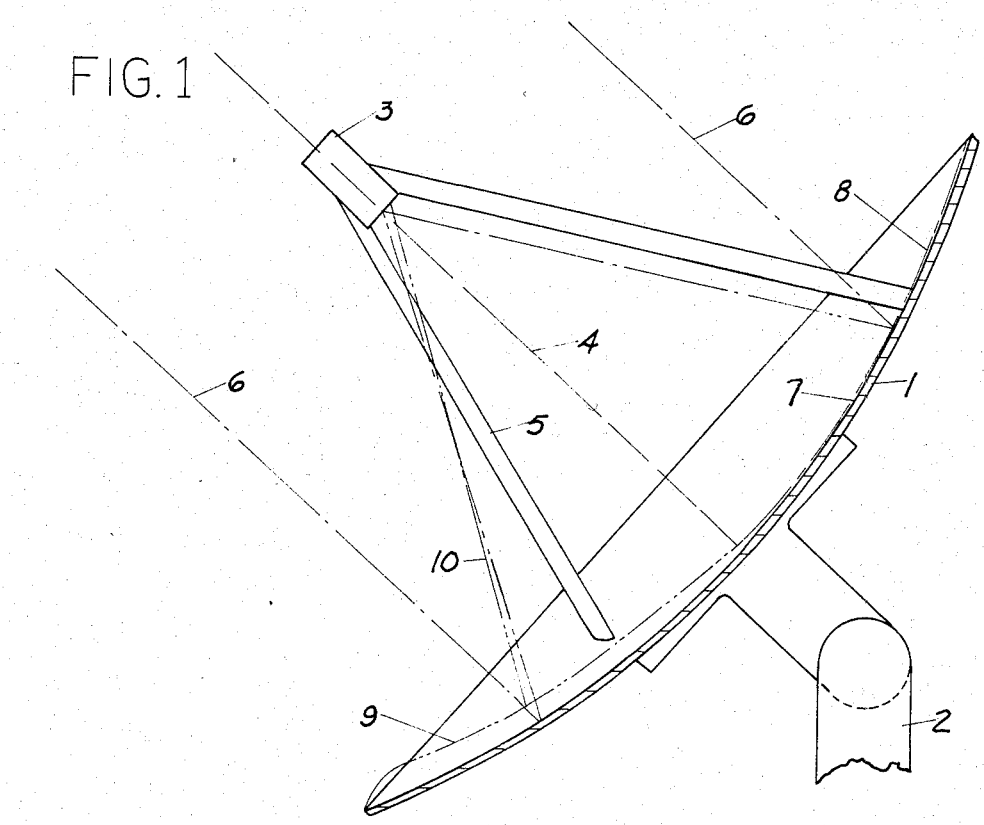
FIG. 1 is a fragmentary cross sectional schematic side elevation view of a typical dish antenna illustrating the accumulation of snow and ice on the antenna reflecting surface.
Figure 2:
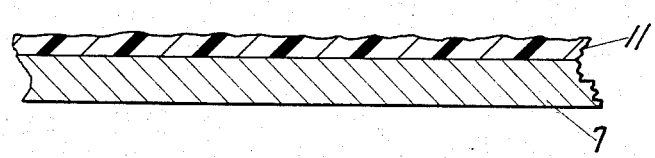
FIG. 2 is an enlarged fragmentary cross sectional view illustrating the coating of the present invention applied to the antenna reflecting surface.

FIG. 1 illustrates a typical antenna installation showing how the accumulation of ice or snow on the reflecting surface of the antenna can affect antenna performance. For purposes of an exemplary showing, the present invention has been described in connection with a parabolic receiving antenna. However, it will be understood that the inventive concepts are applicable to transmitting antennae, as well as other antenna shapes.

As illustrated in FIG. 1, the antenna installation comprises a dish-shaped 1 antenna mounted at a desired inclination angle by means of a mounting structure shown generally at 2. Antenna 1 may be fabricated of any suitable material such as aluminum, fiberglass or the like.

A receiver 3 is positioned at the focal point of antenna 1 along the electrical bore site axis shown schematically at 4, and is supported by a suitable support structure 5. As illustrated in FIG. 1, incoming signals 6 are reflected off the interior reflecting surface 7 of antenna 1, and are focused at receiver 3 at the focal point of the antenna. It will be observed that maximum receive signal strength is obtained when the incomining signals are accurately focused at the focal point of the antenna.

Since the antenna is installed outdoors, there is the possibility that ice or snow may accumulate on the interior surfaces of the antenna dish, particularly on the lower surfaces which have a shallower slope. For example, as illustrated in FIG. 1, the upper portion of the interior surface 7 of the antenna dish is shown with a generally uniform accumulation 8 of ice or snow. The thickness of the accumulation layer will depend upon the coefficient of friction between the ice or snow and the reflecting surface 7 of the antenna. It is common for the reflecting surface to be painted with a rough textured paint which serves to increase the coefficient of friction, enabling a substantial layer of ice or snow to build up, even where there is significant slope to the reflecting surface of the antenna. In addition, the rough textured surface also is wettable, which tends to enhance mechanical attachment of the ice or snow to the surface.

In any event, the accumulated layer attenuates the signal 6 thereby reducing signal strength at the receiver 3. It will be understood that such a uniform layer may build up over all or part of the reflecting surface of the dish antenna.

The accumulated layer of ice or snow may be thicker as at 9 near the lower part of the antenna since the angle of slope is smaller. The thicker layer also acts to actually distort the reflecting surface of the antenna so that the reflected signal 10 is displaced from the focal point of the antenna, again reducing received signal strength. Since the angle of repose of the accumulated ice or snow in the lower part of the antenna is less than that in the upper part, the corresponding coefficient of friction required to prevent sliding of the ice layer from the antenna surface (which is related to the tangent of the angle of repose) is smaller.

The present invention is directed to a method of preventing the accumulated layers of ice and snow by finishing the reflecting surface 7 of the antenna in such a way that it tends to shed any ice or snow build-up.

In a preferred embodiment, the reflecting face 7 of the antenna is coated with a thin layer of weather resistant material 11 having a low coefficient of friction which produces a non-wettable outer surface. The coating material may comprise various types of waxes, fortified waxes or Teflon, or a combination of these. In any event, the coating material will exhibit a static coefficient of friction with snow or ice of no more than 0.4, and preferrably less than 0.1. For example, a coating of polytetrafluorethylene will exhibit a static coefficient of friction with dry snow of from 0.02-0.1, depending upon temperature. Likewise, a coating of Swiss wax will exhibit a static coefficient of friction with dry snow of 0.03-0.2, depending upon temperature.

In any event, the static coefficient of friction of the coating material used will be such to insure that the ice or snow build-up easily slides off of the reflecting surface 7 by itself. The ease with which the antenna sheds the ice or snow accumulation will be dependent upon the angle of repose of the build-up, which in turn is related to the angle of inclination of the antenna bore site axis 4. For example, if the minimum angle of repose of the snow accumulation on the reflecting surface of the antenna is 10°, any coating material having a static coefficient of friction with snow of less than about 0.18 will cause the snow to slide from the reflecting surface.

The coating material also provides a non-wettable surface for the antenna which prevents mechanical attachment to the reflecting surface. This insures that the only force holding the snow or ice to the antenna surface is frictional in nature, which is substantially reduced by the type of non-stick coatings described.

In order to prevent solar radiation from being reflected from the coated surface and concentrated at the focal point of the antenna, the coating material is designed to reduce the solar reflectivity, preferably to 10% or less. This can be accomplished by enhancing the absorptance of the coating material by adding a coloring agent, for example. Alternatively, the entire reflecting surface 7 of the antenna may be darkened or otherwise treated to decrease the reflectivity before the coating material 11 is applied. In this instance, the coating material must be transparent in order to reveal the previously darkened surface 7. It will be observed that the increased absorptance of solar radiation also serves to heat the reflecting surface of the antenna, thereby assisting in melting accumulated ice or snow.

Figure 3:
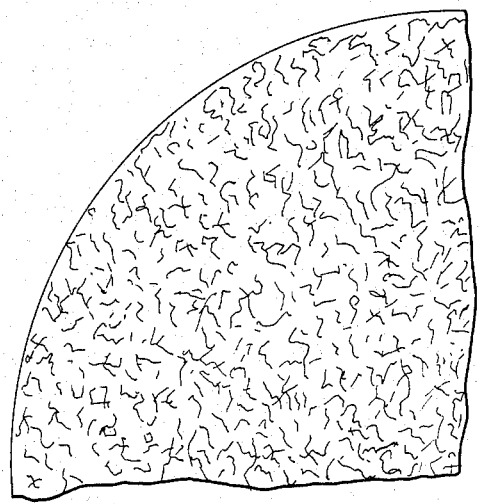
FIG. 3 is a fragmentary frontal view illustrating the coating of the present invention applied to the antenna reflecting surface.

Reflection of solar radiation may also be reduced by providing the coating or reflecting surface of the antenna, or both, with a textured pattern. The texture of the pattern will be such as to prevent sharp interstices in the coating or surface structure that might cause the snow or ice to mechanically adhere, while at the same time dispersing the reflecting solar radiation so that it is not concentrated at the focal point of the antenna. The textured pattern may be described as "orange peel" or "pebbled", and in all cases will exhibit minute smoothly rounded hills and valleys, as best illustrated in FIG. 3. Such a surface may be created by the specific chemistry of the paint used to cover the reflecting surface of the antenna. For example, the hill/valley texture may be developed by applying the paint with a textured roller. Alternatively, the texture may be developed during the polymerization which occurs during the paint baking cycle, and which may be referred to as an "orange peel" finish.

The texture may also be developed by the use of male/female embossing rolls. In this example, a non-wettable non-stick material producing a generally smooth surface is applied to the underlying metallic structure of the antenna. After the material has cured, the coated metal is passed through embossing rolls to provide the texturing. In some instances, only one embossing roll is used with a flat backup roll. Typical examples of embossed patterns that may be used in connection with the present invention are designated as M34, M880, M668 and M456 by Detroit Metalcraft Process, 60 Alfred St., Detroit, Mich. In any event, the texture which is selected will provide the proper hill/valley relationship to insure scattering of solar radiation while producing minimum microwave reflection distortion.

It will be understood that various changes in the details, steps, materials and arrangements of parts, which have been herein described and illustrated in order to explain the nature of the invention, may be made by those skilled in the art within the principle and scope of the invention as expressed in the appended claims. For example, the coating material herein described may be applied by the antenna manufacturer as part of the manufacturing process, or may be applied in the field after the antenna has been installed. Furthermore, in particular applications, the coating may be applied over all or only a portion of the reflecting surface of the antenna.

The embodiments of the invention in which an exclusive property or privilege is claimed are as follows:

1. A method for preventing the build-up of ice and snow on the inclined reflecting surface of a dish antenna, which receives signals from a satellite, comprising coating the reflecting face of the antenna with a thin layer of weather-resistant material having a low coefficient of friction with respect to ice or snow of less than about 0.4 to produce a non-wettable outer surface operable to shed ice and snow, said coating having a textured pattern including minute hills and valleys to reduce solar radiation reflectivity to about 10% or less, yet avoid capillary retention of ice and snow.

2. The method according to claim 1 wherein said coating has a static coefficient of friction with ice or snow of no more than about 0.1.

3. The method according to claim 1 wherein said textured pattern is produced by embossing.

4. The method according to claim 1 wherein said textured pattern is produced by applying a coating material to said reflecting surface with a textured roller.

5. The method according to claim 1 wherein said textured pattern is produced applying a coating material to said reflecting surface and thereafter polymerizing said applied coating.

6. The method according to claim 1 wherein said coating material comprises polytetrafluorethylene.

7. The method according to claim 1 wherein said coating produces a surface having a solar reflectivity of about 10% or less and a coefficient of friction with ice or snow of no greater than about 0.1.

8. In a dish antenna of the type having a concave bowl-shaped reflecting face, said antenna being mounted such that the electrical bore site of the antenna is inclined with respect to the horizontal, the improvement in combination therewith comprising means for preventing the build-up of ice and snow on the reflecting surface of the antenna comprising a thin layer of weather resistant coating material applied to the reflecting face, with a textured surface having minute hills and valleys, said coating material having a low coefficient of friction between the coating and ice or snow of less than about 0.4 and producing a non-wettable outer surface operable to shed ice and snow, wherein said textured surface has a solar reflectivity less than about 10%.

9. The apparatus according to claim 8 wherein the static coefficient of friction between the coating and ice or snow is less than about 0.1.

10. The apparatus according to claim 8 wherein said coating material comprises polytetrafluorethylene.

* * * * *